(12) United States Patent
Udhöfer et al.

(10) Patent No.: US 7,914,050 B2
(45) Date of Patent: Mar. 29, 2011

(54) ADAPTOR AND METHOD FOR CONVERTING STANDARD TUBE FITTING/PORT TO PUSH-TO-CONNECT TUBE FITTING/PORT

(75) Inventors: Andreas Udhöfer, Gütersloh (DE); Dieter Ehrke, Bielefeld (DE); Hiralal Patel, Dublin, OH (US); Kenneth P. Girod, Highland Heights, OH (US); Luis Moreiras, Mentor, OH (US); Andreas Weil, Mentor, OH (US); Le Yu, Hilliard, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 726 days.

(21) Appl. No.: 11/572,472

(22) PCT Filed: Jul. 21, 2005

(86) PCT No.: PCT/US2005/026271
§ 371 (c)(1),
(2), (4) Date: Dec. 31, 2007

(87) PCT Pub. No.: WO2006/012598
PCT Pub. Date: Feb. 2, 2006

(65) Prior Publication Data
US 2008/0136178 A1 Jun. 12, 2008

(30) Foreign Application Priority Data
Jul. 21, 2004 (DE) .................. 10 2004 035 354

(51) Int. Cl.
*F16L 39/00* (2006.01)
(52) U.S. Cl. .................. 285/321; 285/387; 285/12
(58) Field of Classification Search .................. 285/321, 285/276, 387, 93, 12
See application file for complete search history.

(56) References Cited

U.S. PATENT DOCUMENTS 2,125,677 A * 8/1938 Kuchenmeister ............... 285/93
(Continued)

FOREIGN PATENT DOCUMENTS

CA 1319720 5/1989
(Continued)

OTHER PUBLICATIONS

International Search Report for PCT Application No. PCT/US2005/026271.
(Continued)

*Primary Examiner* — David E Bochna
(74) *Attorney, Agent, or Firm* — Renner, Otto, Boisselle & Sklar, LLP

(57) ABSTRACT

An adaptor (45) for converting to a push-to-connect tube fitting/port a standard tube fitting/port body (10, 110, 210, 310, 410, 510, 610) having a threaded portion (11) for threaded attachment of a nut/plug (12), comprises a coupling nut/plug (12, 112, 212, 312, 412, 512, 612) having an axially inner threaded end portion for threaded attachment to the threaded portion (11) of the fitting/port body (10); a tube sealing member (15, 115, 215, 315, 415, 515, 615) contained within the nut/plug (12) for sealing to a tube (19) having a locking surface (22) spaced from the end of the tube (19); and a retention device (23) retained in the nut/plug (12), which nut/plug (12) has at an axially outer end thereof a central opening through which the tube (19) can be inserted into the coupling nut/plug (12), whereby the locking surface (22) can be engaged by the retention device (23) to prevent axial withdrawal of the tube (19) from the coupling nut/plug (12) once inserted; wherein sealing and retention of the tube (19) is effected within the confines of the coupling nut/plug (12) and separate from and without requiring modification of the standard tube fitting/port body (10).

16 Claims, 8 Drawing Sheets

U.S. PATENT DOCUMENTS

| | | | | |
|---|---|---|---|---|
| 2,253,018 | A | 8/1941 | Cowles | |
| 2,805,089 | A | 9/1957 | Hansen | |
| 2,898,130 | A | 9/1959 | Hansen | |
| 2,914,344 | A * | 11/1959 | Anthes | 285/93 |
| 3,120,968 | A | 2/1964 | Calvin | |
| 3,177,018 | A | 4/1965 | Goodwin | |
| 3,317,220 | A | 5/1967 | Bruning | |
| 3,361,453 | A | 1/1968 | Brown et al. | |
| 3,398,977 | A | 9/1968 | Yoneda | |
| 3,447,819 | A | 6/1969 | Borsum et al. | |
| 3,532,101 | A | 10/1970 | Snyder | |
| 3,540,760 | A * | 11/1970 | Jeromson, Jr. et al. | 285/321 |
| 3,592,231 | A | 7/1971 | Lamb | |
| 3,637,239 | A | 1/1972 | Daniel | |
| 3,646,964 | A | 3/1972 | Stratman | |
| 3,666,300 | A | 5/1972 | Russell | |
| 3,758,137 | A | 9/1973 | Kershaw | |
| 3,773,360 | A | 11/1973 | Timbers | |
| 3,788,348 | A | 1/1974 | Johnson | |
| 3,826,523 | A | 7/1974 | Eschbaugh | |
| 3,831,984 | A | 8/1974 | Kutina et al. | |
| 3,847,421 | A | 11/1974 | Eschbaugh | |
| 3,871,691 | A * | 3/1975 | Takagi et al. | 285/321 |
| 3,887,222 | A | 6/1975 | Hammond | |
| 3,922,011 | A | 11/1975 | Walters | |
| 4,055,359 | A | 10/1977 | McWethy | |
| 4,063,760 | A * | 12/1977 | Moreiras | 285/93 |
| 4,077,433 | A | 3/1978 | Maldavs | |
| 4,105,226 | A | 8/1978 | Frey et al. | |
| 4,111,464 | A | 9/1978 | Asano et al. | |
| 4,138,146 | A | 2/1979 | Rumble | |
| 4,150,691 | A | 4/1979 | Maldavs | |
| 4,186,946 | A | 2/1980 | Snow | |
| 4,191,408 | A * | 3/1980 | Acker | 285/321 |
| 4,193,616 | A * | 3/1980 | Sarson et al. | 285/321 |
| 4,198,080 | A | 4/1980 | Carpenter | |
| 4,216,982 | A | 8/1980 | Chow | |
| 4,222,411 | A | 9/1980 | Herzan et al. | |
| 4,240,466 | A | 12/1980 | Herzan et al. | |
| 4,240,654 | A | 12/1980 | Gladieux | |
| 4,261,668 | A | 4/1981 | Rigal | |
| 4,278,276 | A * | 7/1981 | Ekman | 285/321 |
| 4,294,473 | A * | 10/1981 | Ekman | 285/321 |
| 4,401,326 | A | 8/1983 | Blair | |
| 4,471,978 | A * | 9/1984 | Kramer | 285/321 |
| 4,485,845 | A | 12/1984 | Brady | |
| 4,543,993 | A | 10/1985 | Calvin et al. | |
| 4,543,994 | A | 10/1985 | Johnson et al. | |
| 4,564,221 | A | 1/1986 | Ishii | |
| 4,565,392 | A | 1/1986 | Vyse | |
| 4,570,980 | A | 2/1986 | Goward | |
| 4,583,711 | A | 4/1986 | Johnson | |
| 4,645,245 | A * | 2/1987 | Cunningham | 285/321 |
| 4,647,082 | A | 3/1987 | Fournier et al. | |
| 4,660,803 | A | 4/1987 | Johnston et al. | |
| 4,662,656 | A | 5/1987 | Douglas et al. | |
| 4,690,436 | A * | 9/1987 | Hehl | 285/321 |
| 4,702,278 | A | 10/1987 | Badoureaux | |
| 4,723,797 | A | 2/1988 | Veyrat | |
| 4,733,890 | A | 3/1988 | Vyse | |
| 4,750,765 | A * | 6/1988 | Cassidy et al. | 285/321 |
| 4,848,402 | A | 7/1989 | Elser et al. | |
| 4,848,802 | A | 7/1989 | Wolf et al. | |
| 4,850,622 | A | 7/1989 | Suzuki | |
| 4,872,710 | A | 10/1989 | Konecy et al. | |
| 4,906,031 | A | 3/1990 | Vyse | |
| 4,917,525 | A | 4/1990 | Duncan | |
| 5,005,877 | A | 4/1991 | Hayman | |
| 5,022,687 | A * | 6/1991 | Ariga | 285/321 |
| 5,042,848 | A | 8/1991 | Shiozacki | |
| 5,060,689 | A * | 10/1991 | Csaszar et al. | 137/515 |
| 5,074,601 | A | 12/1991 | Spors et al. | |
| 5,112,089 | A | 5/1992 | Richard | |
| 5,193,857 | A | 3/1993 | Kitamura | |
| 5,226,682 | A | 7/1993 | Marrison et al. | |
| 5,230,538 | A | 7/1993 | Kobayashi | |
| 5,240,023 | A | 8/1993 | Shelef et al. | |
| 5,280,967 | A * | 1/1994 | Varrin, Jr. | 285/93 |
| 5,290,009 | A | 3/1994 | Heilmann | |
| 5,301,408 | A | 4/1994 | Berman et al. | |
| 5,385,331 | A | 1/1995 | Allread et al. | |
| 5,419,594 | A | 5/1995 | Nelms | |
| 5,472,242 | A | 12/1995 | Petersen | |
| 5,509,695 | A | 4/1996 | Hummel | |
| 5,553,895 | A | 9/1996 | Karl et al. | |
| 5,570,910 | A | 11/1996 | Highlen | |
| 5,611,923 | A | 3/1997 | Suri et al. | |
| 5,671,955 | A | 9/1997 | Shumway | |
| 5,681,060 | A | 10/1997 | Berg et al. | |
| 5,685,575 | A | 11/1997 | Allread et al. | |
| 5,709,243 | A | 1/1998 | Wells et al. | |
| 5,709,415 | A | 1/1998 | Witter | |
| 5,711,553 | A | 1/1998 | Bonset | |
| 5,727,821 | A | 3/1998 | Miller | |
| 5,876,071 | A | 3/1999 | Aldridge | |
| 5,893,391 | A | 4/1999 | Jenski | |
| 5,918,913 | A | 7/1999 | Lewis et al. | |
| 5,931,509 | A | 8/1999 | Batholomew | |
| 5,975,159 | A | 11/1999 | Persenaire et al. | |
| 6,019,399 | A | 2/2000 | Sweeney | |
| 6,036,237 | A | 3/2000 | Sweeney | |
| 6,056,010 | A | 5/2000 | Wells | |
| 6,089,250 | A | 7/2000 | Johnson | |
| 6,089,616 | A | 7/2000 | Trede et al. | |
| 6,095,910 | A | 8/2000 | Luedeke | |
| 6,183,020 | B1 * | 2/2001 | Luft | 285/93 |
| 6,186,557 | B1 | 2/2001 | Funk | |
| 6,237,631 | B1 | 5/2001 | Geisler et al. | |
| 6,305,721 | B1 | 10/2001 | Heinrichs et al. | |
| 6,371,837 | B1 | 4/2002 | Luedeke | |
| 6,530,604 | B1 | 3/2003 | Luft et al. | |
| 6,533,327 | B1 | 3/2003 | Twardawski et al. | |
| 6,749,231 | B2 | 6/2004 | LeMay et al. | |
| 7,273,236 | B2 * | 9/2007 | Le Quere et al. | 285/321 |
| 7,338,094 | B2 * | 3/2008 | Hoffmann | 285/321 |
| 7,600,790 | B2 * | 10/2009 | Persohn | 285/93 |
| 7,631,905 | B2 * | 12/2009 | McGee et al. | 285/321 |
| 2002/0101079 | A1 | 8/2002 | Ehrke | |
| 2005/0167976 | A1 | 8/2005 | Le Quere et al. | |

FOREIGN PATENT DOCUMENTS

| | | |
|---|---|---|
| DE | 91 01 480.8 | 2/1991 |
| DE | 195 20 099 | 6/1995 |
| DE | 102 14 997 | 4/2002 |
| EP | 0 397 942 | 5/1989 |
| EP | 0 509 157 | 4/1991 |
| EP | 0 483 751 | 10/1991 |
| EP | 0 610 538 | 2/1993 |
| EP | 1 561 988 | 1/2005 |
| GB | 2 070 709 | 1/1981 |
| GB | 2 239 503 | 12/1989 |
| SE | 527 219 | 5/2005 |
| WO | 91/02919 | 8/1990 |
| WO | 96/24002 | 2/1996 |
| WO | 2006/012598 | 7/2005 |

OTHER PUBLICATIONS

International Search Report for PCT Application No. PCT/US2006/028125.

* cited by examiner

ADAPTOR AND METHOD FOR CONVERTING STANDARD TUBE FITTING/PORT TO PUSH-TO-CONNECT TUBE FITTING/PORT

This application is a national phase of International Application No. PCT/US2005/26271 filed Jul. 21, 2005 and published in the English language.

The invention herein described relates generally to tube fittings and ports. More particularly, the invention relates to an adaptor and method converting a standard tube fitting/port to push-to-connect tube fitting/port into which a tube can be pushed to effect a secure and sealed connection with the standard tube fitting/port by means of the adaptor.

BACKGROUND OF THE INVENTION

Push-to-connect tube couplings heretofore have been provided to allow for quick connection and sealing of a tube to the coupling simply by inserting the tube into the coupling. One such push-to-connect tube coupling is described in U.S. Pat. No. 4,063,760. Here a coupling nut is screwed onto the threaded portion of a tubular body having a forward threaded end for connection to another device. A radially expandable lock ring is provided in a chamber in the coupling nut, and the lock ring when in a relaxed condition has an inner diameter less than the outer diameter of the push-in tube. The push-in tube has locking sleeve that is provided with a camming ramp that terminates as a locking surface. When the push-in tube is pushed through the coupling nut and into the tubular body, the camming ramp radially outwardly expands the lock ring into the chamber in the coupling nut to allow passage of the push-in tube. During further pushing of the push-in tube the expanded lock ring slips over the case, until the lock ring passes behind the locking surface thereby securely to fix the push-in tube in the tubular body by the screwed-on coupling nut. The sealing of this fitting is done via a seal inserted in an annular recess at the inside of the tubular body, which seal closely receives the end portion of the push-in tube in a region thereof that extends beyond the locking sleeve.

The tubular body of the '760 patent must be specially fabricated for use in the described manner. In particular, the inner diameter of the tubular body must be turned at its inner diameter to form the annular groove that contains the annular seal that seals around the end of the push-in tube. The position of the seal also makes it somewhat difficult to install the annular seal or replace a worn annular seal as may be needed during the life of the coupling.

SUMMARY OF THE INVENTION

The present invention provides a novel adaptor and method for converting a standard tube fitting/port to push-to-connect tube fitting/port into which a tube (any tubular member) can be pushed to effect a secure and sealed connection with the standard tube fitting/port by means of the adaptor. Accordingly, no longer is there a need to specially fabricate coupler bodies to provide a push-to-connect tube fitting/port. Instead, a standard fitting/port body can be provided with a quick push-to-connect feature through the use of an adaptor according to the present invention. Consequently, the present invention provides for adaptation of fittings already in use in the field. The invention has particular applicability, but without limitation, to standard fittings of the following types: face seal fittings, internal cone style fittings and external cone style fittings. Standard fittings are those for which specifications have been adopted by industry-recognized agencies such as SAE, ISO, BS and JIS.

The invention is characterized by the features recited in the appended claims.

In particular, the invention provides an adaptor for converting to a push-to-connect tube fitting/port a standard tube fitting/port body having a threaded portion for threaded attachment of a nut/plug and a seal or sealing surface separate from the threaded portion of the standard tube fitting/port body. The adaptor comprises a nut/plug having an axially inner threaded end portion for threaded attachment to the threaded portion of the fitting/port body; an annular tube seal or sealing member contained within the coupling nut/plug for sealing to an outer diameter surface of a tube having a locking surface spaced from the end of the tube; a radially expandable and contractible retention device retained in the coupling nut/plug, which coupling nut/plug has at an axially outer end thereof a central opening through which the tube can be inserted into the coupling nut/plug, whereby the locking surface can be engaged by the retention device to prevent axial withdrawal of the tube from the coupling nut/plug once inserted; a support ring separate from or integral with the coupling nut/plug and axially interposed between the lock ring and the tube seal or sealing member; and a sealing surface or seal integral with or separate from the annular sealing member for sealing to the seal or sealing surface of the standard tube fitting/port body.

According to one embodiment of the invention particularly suited for use with a threaded fitting body having a 24° cone sealing surface for sealing to a tube through use of a pressure sleeve and nut, the standard sleeve and nut are replaced by a specially configured coupling nut including a sealing ring and a lock ring, particularly a snap lock ring, within an interior chamber of the coupling nut. The sealing ring has a sealing rim for sealing to the 24° cone surface and the outer diameter of the tube when inserted therein. A lock ring is supported axially by a support surface when the tube is pushed into the coupling nut, and engages a locking surface provided on the tube by shaping of its tube wall.

Accordingly, a standard 24° cone fitting body can be used without constructional change because the sealing of the tube is shifted into the region of the coupling nut, i.e. in the chamber of the coupling nut in which the lock ring also is arranged. The sealing ring provides at the same time a support surface for preventing axial shifting movement of the lock ring when the tube is push through the lock ring to cause lock ring to radially expand for sliding along the outer diameter of the tube. The internally threaded portion of the coupling nut is sized to allow for axial insertion of the sealing ring and lock ring into the interior chamber of the coupling nut, thereby eliminating any need to form lock ring groove in the radial wall of the coupling nut. Finally it is desirable that the locking surface be provided on the push-in tube deforming the wall of the tube.

As a result of the invention, any standard 24° cone fitting body can be converted by an adaptor according to the invention to a quick push-to-connect tube fitting. This applies, in particular, to connections for stop valves or piping valves, such as valves, cocks and the like, provided that they have a standard 24° cone and externally threaded portion for connection of a standard coupling nut. In addition, the invention can be used for high pressure fittings since the lock ring is fixedly secured in the coupling nut in one of the different execution forms herein disclosed and the locking surface may be formed by shaping the push-in tube, particularly when the tube is made of metal.

The invention also provides for the use of a standard coupling nut that has a beveled surface, particularly a 45° beveled surface, at the bottom of the chamber. This is accomplished through provision of a recess in the support disk at its side nearest the bottom wall of the coupling nut. This recess in the support disk is sized to allow for radial expansion of the lock ring when a tube is being pushed therethrough.

Further in accordance with the invention, the push-in tube may be provided with a marking that is covered by the coupling nut when the push-in tube is inserted, thereby indicating the complete assembly position of the tube in the fitting assembly.

According to another aspect of the invention, an adaptor for converting to a push-to-connect tube fitting/port a standard tube fitting/port body having a threaded portion for threaded attachment of a nut/plug, comprises a coupling nut/plug having an axially inner threaded end portion for threaded attachment to the threaded portion of the fitting/port body; a tube sealing member contained within the nut/plug for sealing to a tube having a locking surface spaced from the end of the tube; and a retention device retained in the nut/plug, which nut/plug has at an axially outer end thereof a central opening through which the tube can be inserted into the coupling nut/plug, whereby the locking surface can be engaged by the retention device to prevent axial withdrawal of the tube from the coupling nut/plug once inserted; wherein sealing and retention of the tube is effected within the confines of the coupling nut/plug and separate from and without requiring modification of the standard tube fitting/port body.

According to yet another aspect of the invention, a method of converting to a push-to-connect tube fitting/port a standard tube fitting/port body having a threaded portion for threaded attachment of a nut/plug, comprises the steps of threading onto the threaded portion of the standard tube fitting/port body an adaptor as set forth above.

The invention is also applicable to the connection of hose lines and/or connection of a hose line to a tube, the push-in tube being arranged as a tube piece with limited length whereby a hose line and/or hose fitting may be attached to the tube piece.

The invention also provides push-to-connect fitting/port assemblies comprising a standard tube fitting/port body and an adaptor according to the invention.

The foregoing and other features of the invention are hereinafter described in detail in conjunction with the accompanying drawings which set forth exemplary embodiments illustrating a few of the various ways in which the principles of the invention may be employed.

DETAILED DESCRIPTION

The invention will now be described in detail by way of various exemplary embodiments shown in the annexed figures.

Figure 1:
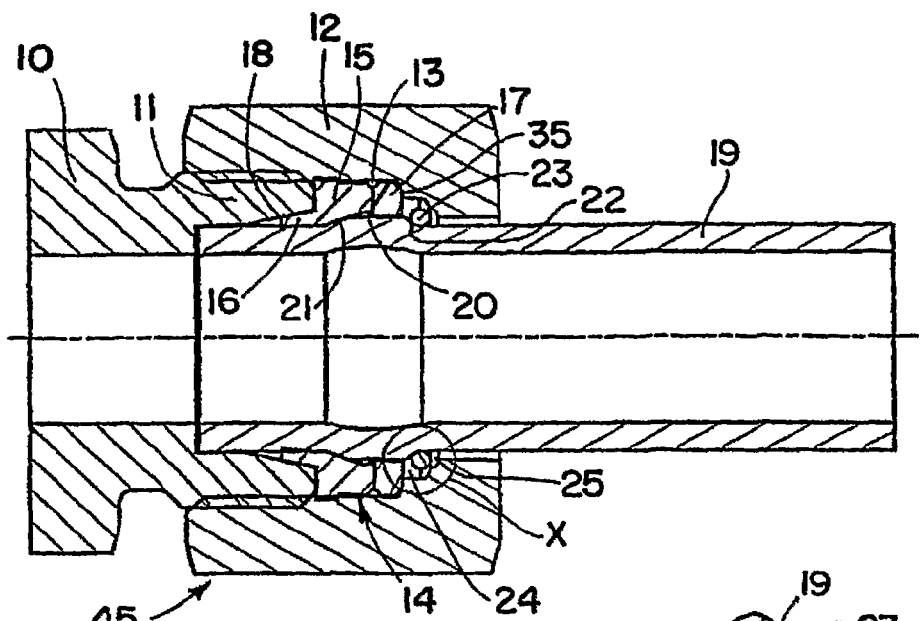
FIG. 1 is a cross-sectional view of an adaptor according to the invention, shown in combination with a standard tube fitting body and push-in tube.
Figure 2:
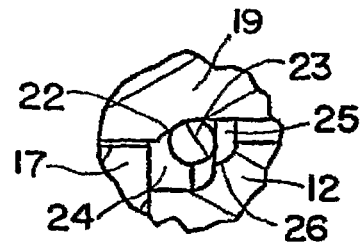
FIG. 2 is an enlargement of the circled portion "X" in FIG. 1.

FIGS. 1 and 2 Embodiment

FIG. 1 shows an exemplary push-to-connect fitting assembly 8 with a push-in tube 19 shown inserted therein. The fitting assembly 8 comprises a threaded fitting body 10, such as a standard 24° cone body as shown in FIG. 1 and further described in DE 195 20 099 C2, which is hereby incorporated herein by reference in its entirety. The threaded fitting body 10 has a threaded connecting portion 11 provided with an appropriate thread onto which a coupling nut 12 is screwed to form a chamber 13 between a bottom wall 35 of the coupling nut 12 and a conical end of the threaded fitting body 10. Within this chamber 13 there is arranged a sealing ring 14 which includes a seal part 15 and a support disk 17 (the support disk is also herein referred to as a support ring). The seal part 15 has an annular sealing lip or ring portion 16 that effects a seal between the outer diameter of the tube 19 and a conical sealing surface 18 at the inner diameter of the threaded connecting portion 11. As will be appreciated, tightening of the coupling nut 12 on the threaded connecting portion 11 will urge the support disk 17 against the outer axial face of the seal part 15, and this will urge the sealing lip 16 axially against the conical sealing surface 18, which in turn will urge the sealing lip into tight gripping and sealing engagement with the tube 19.

The seal part 15 and the support disk 17 can be formed as separate pieces as shown, or, if desired, as one piece, such as by gluing the seal part and support disk to one another, or by molding the seal part to the support disk, for example.

As seen in FIG. 1, the tube 19 is provided with a bulge 20 (which may also be referred to as a ridge) formed, for example, by deformation of the tube wall, which may be made of metal. The bulge 20 has with a front expanding face or ramp 21 and a rear locking face 22. Both faces 21 and 22 may have conical shape with the slopes of the surfaces disposed opposite one another.

The bulge 20 cooperates with a resiliently expandable lock ring disposed within the chamber 13 of the coupling nut 12. The lock ring 23 is arranged between the support disk 17 and a bottom wall 35 of the coupling nut 12. When the tube is inserted through a central opening in the bottom wall of the coupling nut and telescopically into the lock ring, the lock ring will freely pass over the end of the tube until it reaches the front expanding face 21 of the bulge 20, since the ring in its normal relaxed condition has a diameter slightly greater than the outer diameter of the leading end of the tube but smaller than the outer diameter of the bulge 20. Upon further insertion, the front expanding face 21 will cammingly cause the ring to expand radially in diameter until it can slide over the bulge. When the ring reaches the rear locking face 22, it will snap radially inwardly behind the bulge.

The bottom wall 35 of the coupling nut 12 is provided with a recess for receiving the lock ring 23. The recess has a first recess step 24 forming a continuation of the chamber 13 and a second recess step 25 following the first step 24. The first recess step 24 has such a dimension that allows the lock ring 23 to expand radially outwardly a distance sufficient to allow the lock ring to slide over the bulge when the tube is pushed through the lock ring. The second recess step 25 is dimensioned such that it will closely surround the lock ring 23 when engaged behind the locking face 22 and thereby prevent the lock ring from expanding radially by an amount that would allow it to pass back over the bulge, i.e., the diameter of the step 25 is less than the outer diameter of the bulge. Thus, the lock ring will grip behind the bulge and prevent the tube from being withdrawn when the lock ring is disposed in the recess step 25.

In FIG. 2 the lock ring 22 can be seen in its unloaded pushing position where it rests against a transition corner 26 between first recess step 24 and second recess step 25. When pressure and or tensile load is applied to the tube, the lock ring 23 will be completely shifted into the second recess step 25 whereupon the tube will be securely held in the fitting assembly against pull out even under high pressure/force conditions.

That is, the radial walls of first recess step and second recess step are parallel to each other, thereby providing a stepped transition 26 between the two recess steps. This transition can be arranged in such a way that the lock ring lies in its relaxed position within the transition between the two recess steps and is only pulled into the second recess step during tensile load of the adaptor and thus held in the second recess step, whereby a large pressure strength is given to the tube and fitting assembly.

In view of the foregoing, the coupling nut 12, seal part 15, support disk 17 and lock ring 22 together form an adaptor 45 for converting the fitting body 10 to a push-to-connect tube fitting. Suitable means may be employed to hold the seal part 15, support disk 17 and lock ring 22 in the coupling nut when not assembled to a fitting body. For example, the seal part 15 may have an outer diameter slightly greater than the inner diameter of corresponding portion of the chamber 13 in which is fits, whereby the seal part 15 will be retained in the coupling nut (or plug) with a friction fit and the support disk and locking ring will be retained in the coupling nut by the seal part. In another arrangement, the seal part may have on the outer diameter thereof a rubber or plastic ring which effects the friction fit with the interior or the coupling nut (or plug).

It further is noted that the above described preferred construction of an adaptor according to the invention lends itself to easy and inexpensive fabrication of the component parts thereof as well as the overall fitting assembly. First, a standard fitting body can be used without any special processing, such as formation of a seal groove at the inner diameter thereof. Second, the coupling nut does not require any machining of grooves at the inner diameter of the opening in the bottom wall thereof, inasmuch as the lock ring is axially supported by the support disk 17. Notwithstanding, benefits of the herein described invention can still be obtained even if the support disk were formed integrally with the coupling nut.

Figure 3:
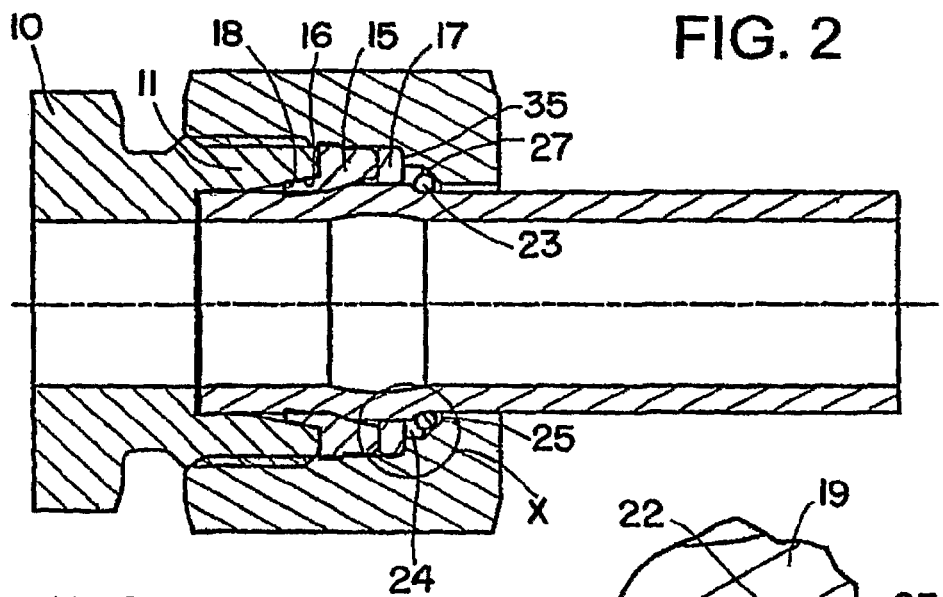
FIG. 3 is a cross-sectional view similar to FIG. 1, but showing another version of an adaptor according to the invention.
Figure 4:
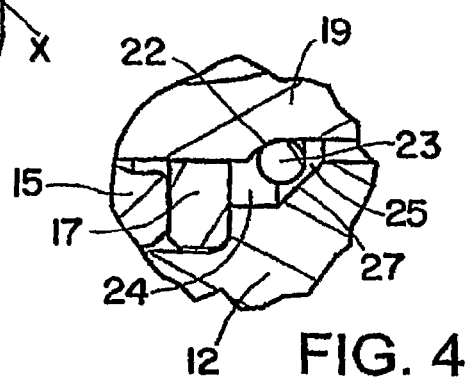
FIG. 4 is an enlargement of the circled portion "X" in FIG. 3.

FIGS. 3 and 4 Embodiment

Another fitting assembly according to the invention is shown In FIGS. 3 and 4, wherein components corresponding to those shown in FIGS. 1 and 2 have been given the same reference numerals. In the FIGS. 3 and 4 embodiment, the transition between the first recess step 24 and the second inner recess step 25 is formed by a beveled surface 27. During application of pressure or tension force, the beveled surface 27 will radially inwardly force the lock ring 23 into tight pressing engagement with the outer diameter of the tube and thereby reduce or eliminate any axial and/or radial play between the lock ring and the tube. This is particularly advantageous when the fitting assembly and tube may be subjected to dynamic loads such as vibrations or pressure shocks.

In the above-described embodiments, the coupling nut differs from a standard coupling nut. In this situation, the non-standard coupling nut may be provide with a marking that serves to distinguish the coupling nut from other coupling nuts. Such markings can be provided, for example, in the form of deformations in the exterior of the coupling nut such as grooves, beads, knurling, or some other form of marking. Another option is to change and/or interrupt the usual hexagonal form in order to provide a visual distinction.

FIGS. 5-8 Embodiments

Additional fitting assemblies according to the invention are shown In FIGS. 5-8, wherein components corresponding to those shown in FIGS. 1-4 have been given the same reference numerals. In the FIGS. 5-8 embodiments, a standard coupling nut 28 is used without any special treatment. The standard coupling nut has a 45° beveled surface 29 at the bottom of the chamber 13.

Figure 5:
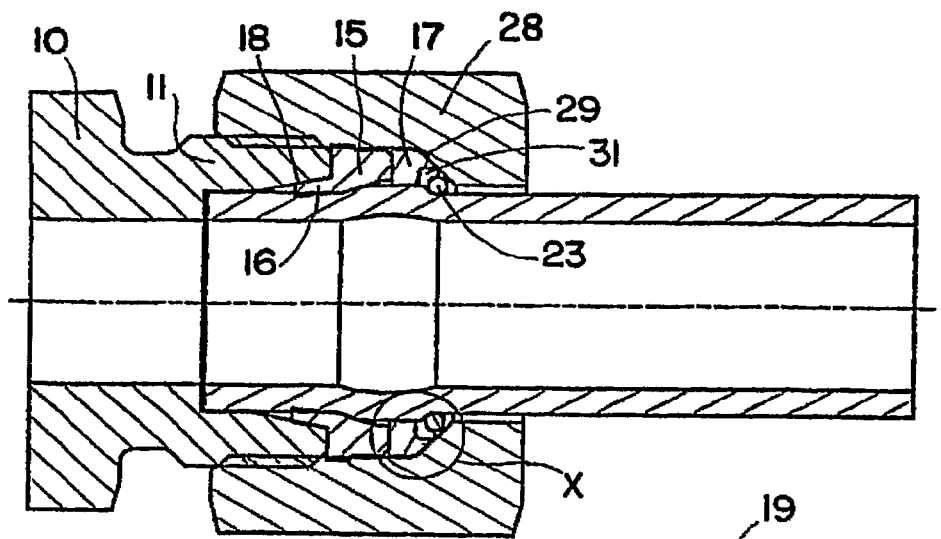
FIG. 5 is a cross-sectional view similar to FIGS. 1 and 3, but showing still another version of an adaptor according to the invention.
Figure 6:
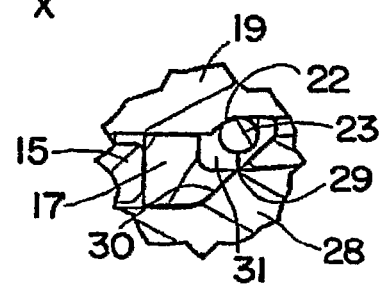
FIG. 6 is an enlargement of the circled portion "X" in FIG. 5.

The use of a standard coupling nut 28 is enabled in the FIGS. 5 and 6 embodiment by providing in the support disk 17 with a recess 31 on the side thereof facing the bottom wall of the coupling nut. The recess 31 accommodates radial expansion of the lock ring 23 when passing over the bulge of the tube 19. Thus, the recess 31 serves the function of the above-described step 24 while the beveled surface 29 serves the function of the above-described beveled surface 27. When pressure is applied, the support disk will be urged against the bottom wall of the coupling nut and the beveled surface 29 will radially inwardly force the lock ring into tight engagement with the outer diameter surface of the tube.

Figure 7:
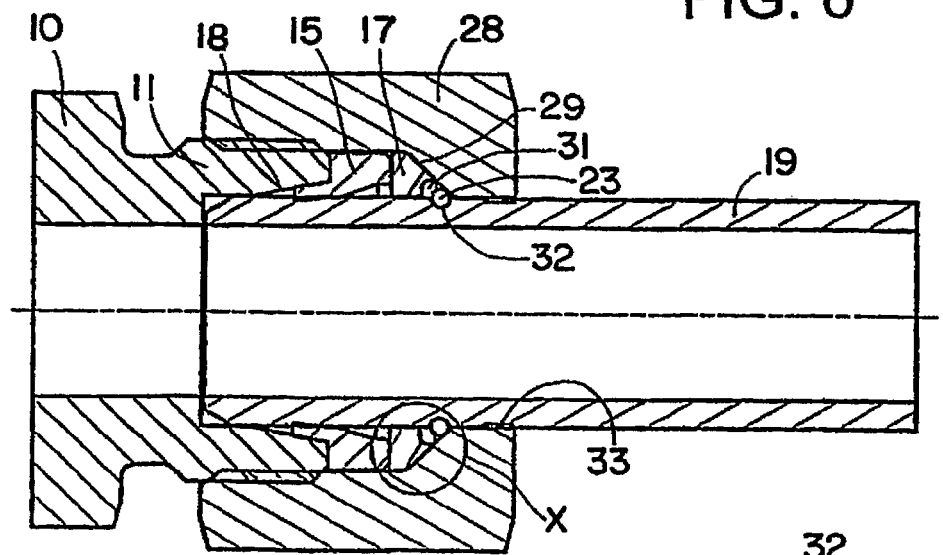
FIG. 7 is a cross-sectional view similar to FIGS. 1, 3 and 5, but showing yet another version of an adaptor according to the invention.
Figure 8:
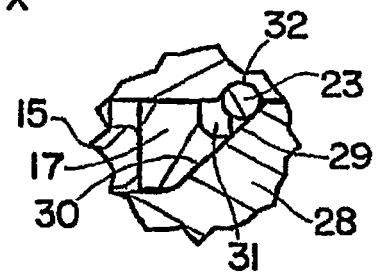
FIG. 8 is an enlargement of the circled portion "X" in FIG. 7.

In FIGS. 7 and 8 embodiment, the lock ring 23 is arranged to engage in a groove 32 in the outer surface of the wall of the tube 19, which groove can be easily formed in the tube by suitable means. The groove 32 functions to positively receive the lock ring 23 when the tube 19 is inserted into the fitting assembly. In essence, the groove forms forwardly thereof a bulge that extends to the leading end of the tube, with the forward wall of the groove providing the locking surface that is engaged by the lock ring to prevent axial withdrawal of the tube. Preferably, the leading end of the tube is provided with a beveled surface for assisting in expansion of the lock ring when the tube is inserted into the lock ring.

In the FIGS. 7 and 8 embodiment the recess 31 in the support disk 17 is sized to accommodate expansion of the lock ring so that it can slide along the tube until the groove in the tube passes thereunder, at which point the lock ring will snap into the groove. The gap between the coupling nut 12 and the tube 19 preferably is smaller than in the FIGS. 5 and 6 embodiment, which causes better guidance of the tube and provides a positive effect when dynamic loads occur. When pressure is applied, the support disk will be urged against the bottom wall of the coupling nut and the beveled surface 29 will radially inwardly force the lock ring into tight engagement in the groove in the tube.

As illustrated in FIG. 7, a marking 33 may be provided on the outer circumference of the tube. The marking 33 serves to indicate a desired extent of insertion of the tube into the fitting assembly, thereby to ensure that the tube has been inserted sufficiently to engage the locking ring in the groove (or behind the bulge in the other embodiments). If the marking 33 has completely disappeared within the coupling nut 12, the connection is duly established. The marking 33 can be formed as a colour marking, as a groove or as another marking configured during deformation of the tube. The marking can be employed with any of the herein described embodiments as well as other embodiments according to the invention.

FIG. 9 Embodiment

Figure 9:
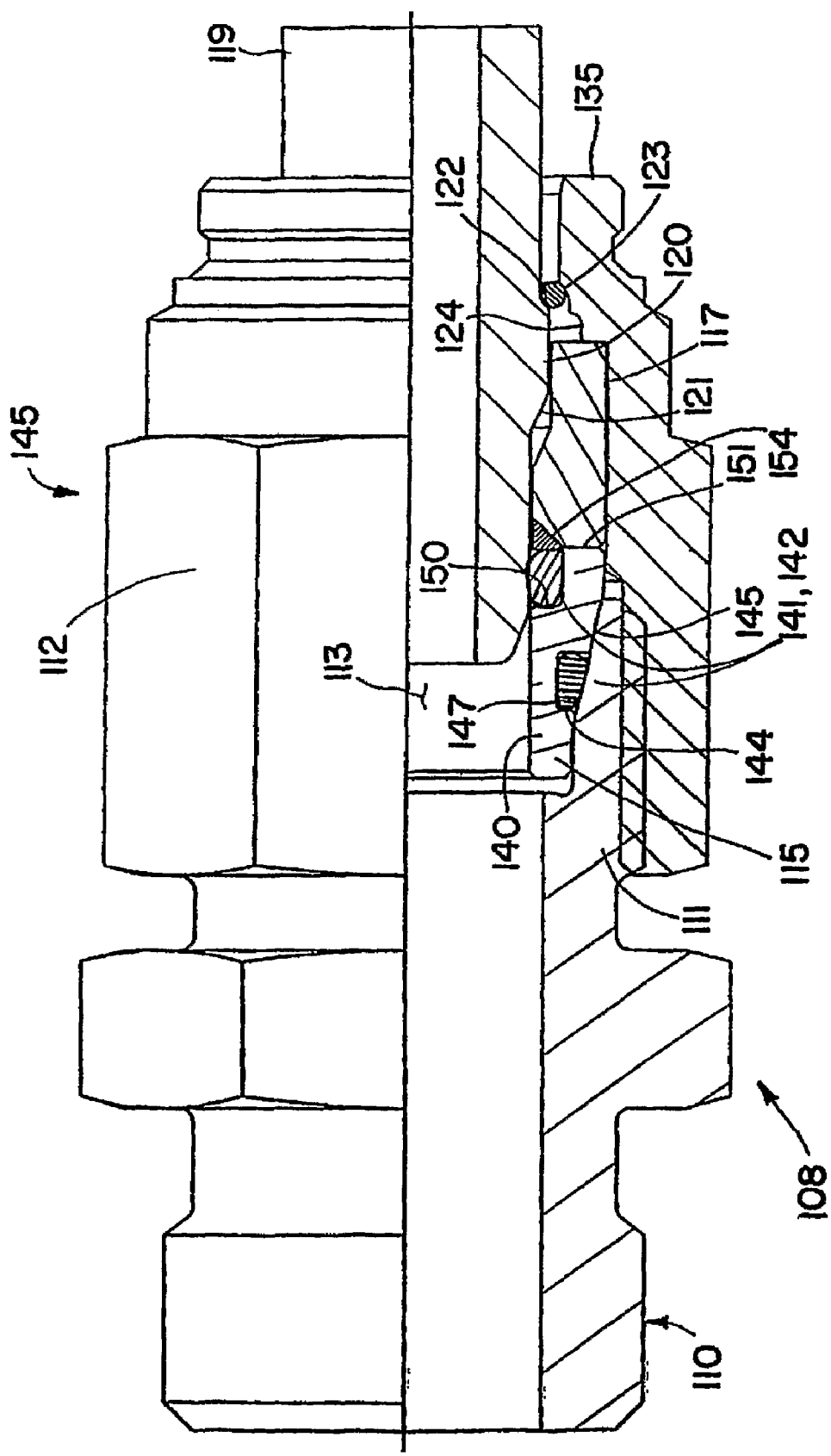
FIG. 9 is a cross-sectional view of another adaptor according to the invention, shown in combination with a standard tube fitting body and push-in tube.

FIG. 9 shows another adaptor 145 according to the invention for converting a fitting body 110, particularly a standard 24° cone body, to a push-to-connect tube fitting assembly 108. The threaded fitting body 110 has a threaded connecting portion 111 provided with an appropriate thread onto which a coupling nut 112 is screwed to form a chamber 113 between a bottom wall 135 of the coupling nut 112 and a conical end of the threaded fitting body 110. Within this chamber 113 there is arranged a sealing ring 114 which includes a seal part 115 and a support ring 117 (which may also be referred to as a backup ring).

Unlike the embodiment shown in FIGS. 1 and 2, the seal part 115 includes a seal carrier 140 and a pair of annular seals, such as O-rings 141 and 142. The seal 141 is retained in an annular groove 144 formed in the outer surface of a conical portion 145 of the carrier. The conical portion 145 has the same cone angle as the interior surface 147 of the cone body 110, i.e., a 24° cone angle. Accordingly, the conical portion 145 will closely mate with the interior conical sealing surface 147 of the fitting body with the O-ring 141 sealing against the conical sealing surface 147.

The other O-ring 142 is received in an annular groove or notch 150 formed on the inner diameter surface of the seal carrier 140 for sealing to the outer diameter surface of the tube 119. The groove is preferably at the outer axial end face 151 of the seal carrier, and the O-ring is axially trapped in the groove by the support ring 117 that has an inner axial end face 151 abutting the outer axial end face 151 of the seal carrier. As is preferred, the support ring 117 has a beveled surface radially inwardly of the inner axial end face 151 to form a triangular recess. The triangular recess is filled by a correspondingly sized anti-extrusion ring 154.

Under fluid pressure the O-ring 141 provides a seal at the interface with the conical sealing surface of the fitting body. The tube sealing O-ring will push on the anti-extrusion ring forcing it to slide down the taper at the inner end of the support ring, closing any gap between the tube and the support ring. This prevents any extrusion of the O-ring between the support ring and the tube.

The tube 119 is provided with a bulge 120 that has a front expanding face or ramp 121 and a rear locking face 122. Both faces 121 and 122 may have conical shape with the slopes of the surfaces disposed opposite one another. As shown, the portion of the tube forward of the bulge may have an outer diameter smaller than the outer diameter of the tube behind the bulge, if desired. The support ring 117 is correspondingly stepped at it inner surface, the axially outer portion corresponding in diameter to the outer diameter of the bulge and the axially inner portion corresponding in diameter to the outer diameter of tube forward of the bulge.

The bulge 120 cooperates with a resiliently expandable lock ring 123 disposed within the chamber 113 of the coupling nut 112. The lock ring 123 is arranged between the support disk 117 and a bottom wall 135 of the coupling nut 112. When the tube is inserted through a central opening in the bottom wall of the coupling nut and telescopically into the lock ring, the lock ring will freely pass over the end of the tube until it reaches the front expanding face 121 of the bulge 120, since the ring in its normal relaxed condition has a diameter slightly greater than the outer diameter of the leading end of the tube but smaller than the outer diameter of the bulge 120. Upon further insertion, the front expanding face 121 will cammingly cause the ring to expand radially in diameter until it can slide over the bulge. When the ring reaches the rear locking face 122, it will snap radially inwardly behind the bulge.

The bottom wall 135 of the coupling nut 112 is provided with a recess for receiving the lock ring 123. The recess has a first recess step 124 forming a continuation of the chamber 113 and a second recess step 125 following the first step 124. The first recess step 124 has such a dimension that allows the lock ring 123 to expand radially outwardly a distance sufficient to allow the lock ring to slide over the bulge when the tube is pushed through the lock ring. The second recess step 125 is dimensioned such that it will closely surround the lock ring 123 when engaged behind the locking face 122 and thereby prevent the lock ring from expanding radially by an amount that would allow it to pass back over the bulge, i.e., the diameter of the step 125 is less than the outer diameter of the bulge. Thus, the lock ring will grip behind the bulge and prevent the tube from being withdrawn when the lock ring is disposed in the recess step 125.

The coupling nut 112, seal part 115, support disk 117 and lock ring 122 preferably are preassembled to form the adaptor 145 for converting the fitting body 110 to a push-to-connect tube fitting. Suitable means may be employed to hold the seal part 115, support disk 117 and lock ring 122 in the coupling nut when not assembled to a fitting body. As mentioned elsewhere herein, such means may be press fitting the seal part or a retention ring into the coupling nut, which seal part or retention ring may be provided with a yieldable collar, such as a rubber or plastic collar, the provides a friction fit with the interior of the coupling nut (or plug).

FIG. 10 Embodiment

Figure 10:
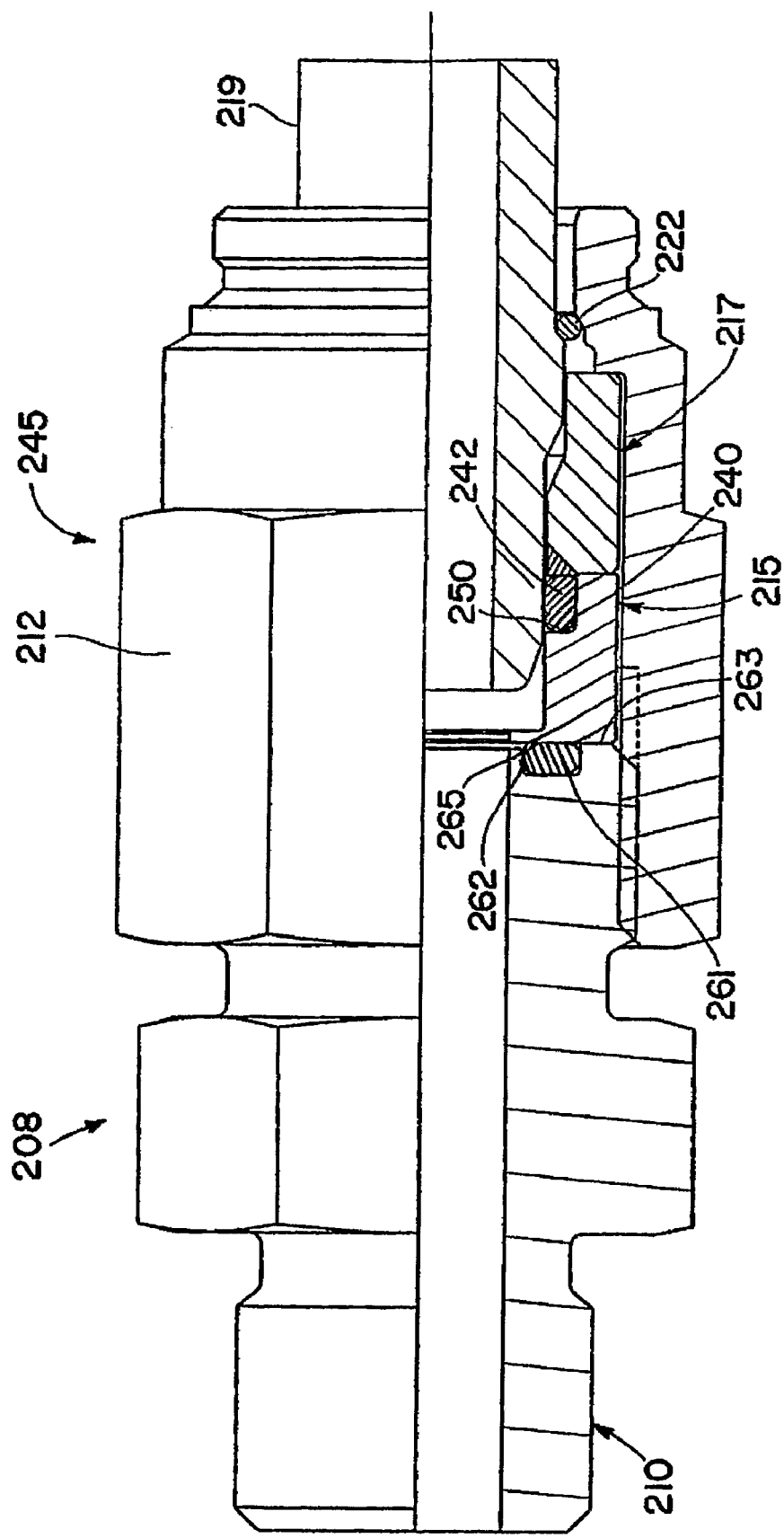
FIG. 10 is a cross-sectional view of another adaptor according to the invention, shown in combination with a standard tube fitting body and push-in tube.

FIG. 10 shows another adaptor 245 according to the invention for converting a fitting body 210, particularly a Seal-Lok fitting body or other face seal fitting body that has O-ring 261 fitted in a groove 262 in the end face 263 of the fitting body, to a push-to-connect tube fitting assembly 208. The adaptor 245 is the same as the adaptor 145 of FIG. 9, except for a different configuration of the seal part 215. The seal part 215 includes a seal carrier 240 of generally cylindrical shape that, like the seal carrier 140, is provided at its rear axial end with an annular groove or notch 250 formed on the inner diameter surface of the seal carrier for receiving the O-ring seal 242 that seals to the outer diameter surface of the tube 219. The seal carrier, however, has a forward axial end face 265 that is perpendicular to the axis of the seal carrier and which is radially dimensioned to span substantially the full radial extent of the sealing face 262 of the fitting body 260. The axial end face 265 serves as a sealing surface contacted by the O-ring 262 to seal the interface between the seal carrier 240 and the fitting body 260.

FIG. 11 Embodiment

Figure 11:
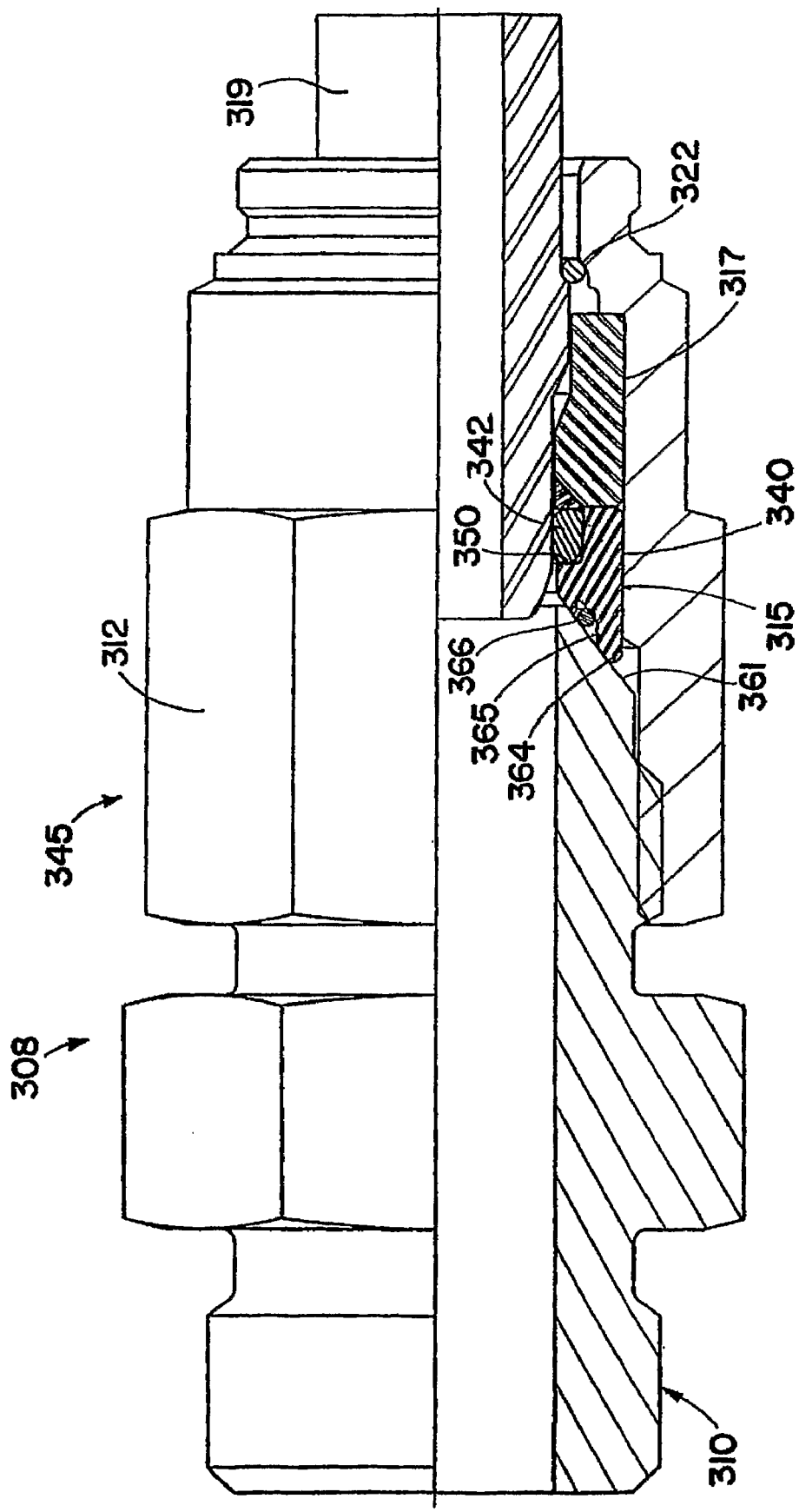
FIG. 11 is a cross-sectional view of another adaptor according to the invention, shown in combination with a standard tube fitting body and push-in tube.

FIG. 11 shows yet another adaptor 345 according to the invention for converting a fitting body 360, particularly a Triple-Lok 37° flare tube fitting body or other flared tube fitting body that has a flared tube sealing surface 361 at the nose of the fitting body, to a push-to-connect tube fitting assembly 308. The adaptor 345 is the same as the adaptor 145 of FIG. 9, except for a different configuration of the seal part 315. The seal part 315 includes a seal carrier 340 of generally cylindrical shape that, like the seal carrier 140, is provided at its rear axial end with an annular groove or notch 350 formed on the inner diameter surface of the seal carrier for receiving the O-ring seal 342 that seals to the outer diameter surface of the tube 319. The seal carrier, however, has a forward axial end face 364 that is beveled to match the bevel 361 at the nose of the fitting body 360. The beveled end face 364 has formed therein an annular groove 365 for receiving an annular seal 366 such as an O-ring as shown. The O-ring 366 seals the interface between the seal carrier 340 and the fitting body 360.

FIG. 12 Embodiment

Figure 12:
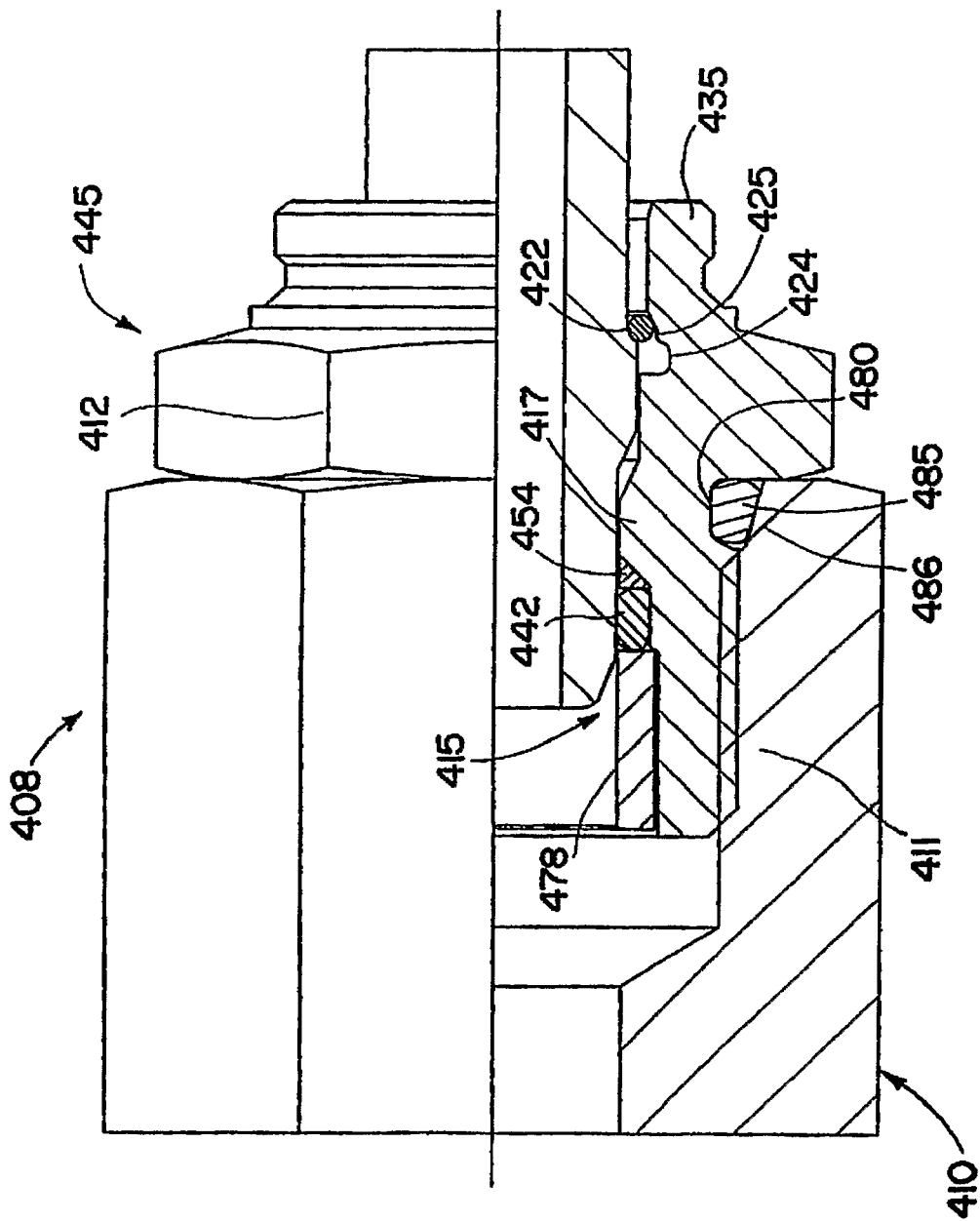
FIG. 12 is a cross-sectional view of another adaptor according to the invention, shown in combination with a standard port body and push-in tube.

FIG. 12 shows an exemplary adaptor 445 according to the invention for converting a port body 410, particularly a standard tube port body with straight threads, to a push-to-connect tube fitting assembly 408. The port body 410 has an internally threaded connecting portion 411 provided with an appropriate thread for threaded receipt of a coupling plug 412. The coupling plug has a support ring portion 417 integrally formed therein, which portion is axially spaced inwardly from a bottom or end wall 435 of the coupling nut to form a stepped recess in which a lock ring 422 is located. The stepped recess has a first recess step 424 and a second recess step 425 which correspond to the above described first and second recess steps 124 and 125 both in function and configuration. Likewise, the lock ring functions as described above to retain in the coupling plug the end of a tube that is provided with a bulge.

A seal part 415 of the adaptor 445 includes an annular seal 442 such as an O-ring that seals the interface between the coupling plug and the tube. The support ring portion 417 of the coupling plug preferable has a beveled surface for receiving an anti-extrusion ring 454. Under fluid pressure the O-ring 442 will push on the anti-extrusion ring forcing it to slide down the taper at the inner end of the support ring portion, closing any gap between the tube and the coupling plug. This prevents any extrusion of the O-ring between the coupling plug and the tube.

The seal 442 is retained in a groove defined by the anti-extrusion ring, a radially relieved portion of the coupling plug, and a retaining sleeve 478. The retaining sleeve 478 is fitted within the interior chamber of the coupling plug and may be held in place, for example, by an interference fit with the interior chamber wall surface of the coupling plug.

In order to seal the coupling plug to the port body, the coupling plug has an annular recess 480 between the externally threaded portion thereof and a wrenching portion 481 that is configured to allow for turning of the coupling plug by a suitable tool, such as a wrench. The recess 480 retains an annular seal 485, such as an O-ring, that seals against a beveled sealing surface 486 provided on the port body axially outwardly of the internally threaded portion thereof. A standard SAE J1926 port, for example, has a straight female thread with a taper (bevel) at the outer end (12° or 15° depending on size), which taper is intended to provide a sealing surface for an O-ring. Thus, no special processing of the port body is needed to effect the conversion afforded by the adaptor 445.

While the plug-port body interface is sealed by the O-ring at the taper 486, the sealing can be effected elsewhere. For example, the coupling plug may be provided, for example in the side surface of the wrenching portion, with a groove containing a seal for sealing against the axial end face of the port body. In another embodiment a portion of the plug interiorly of the male threads may be provided with an O-ring or other seal for sealing against an interior sealing surface of the port body interiorly of the female threads.

FIG. 13 Embodiment

Figure 13:
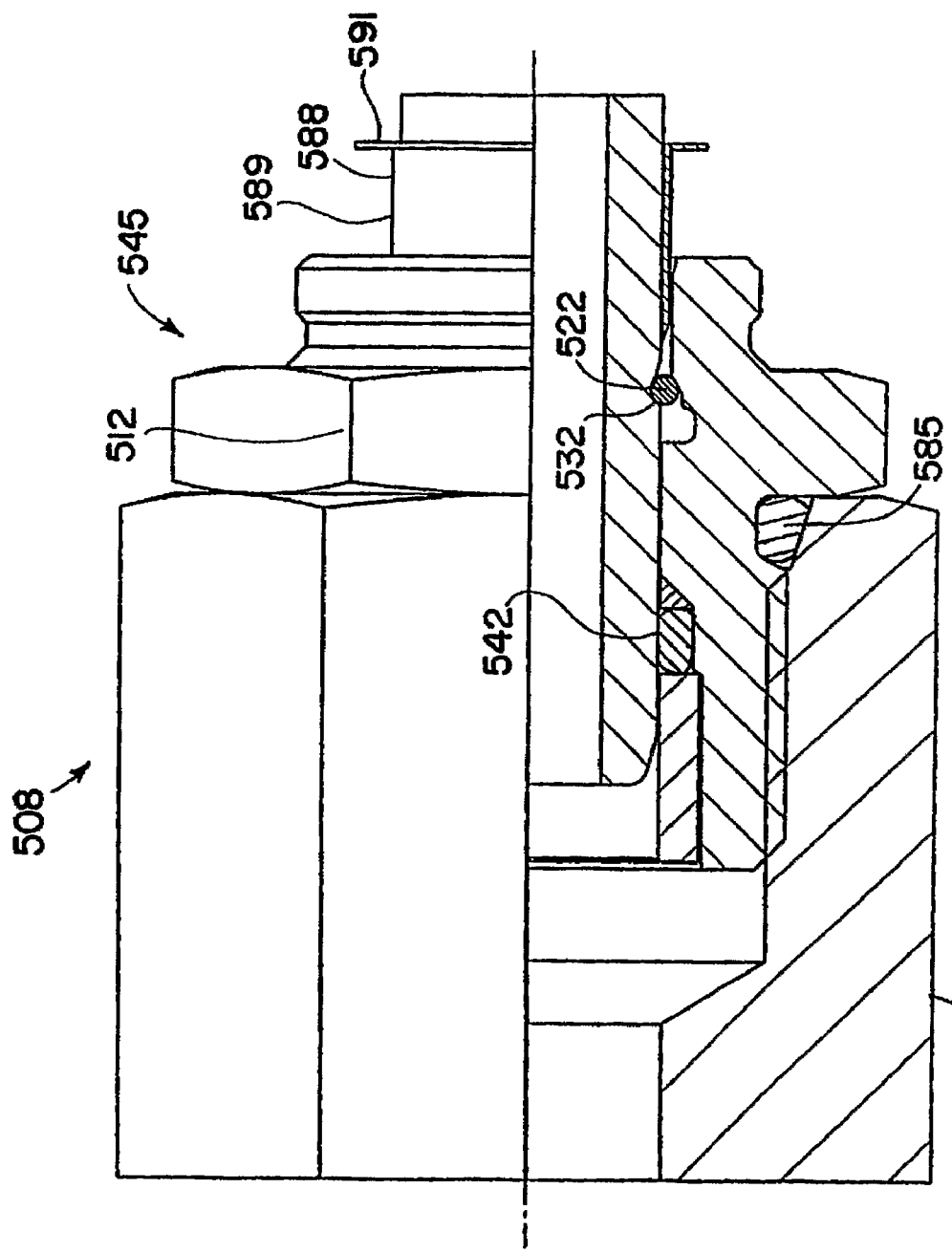
FIG. 13 is a cross-sectional view of another adaptor according to the invention, shown in combination with a standard port body and push-in tube.

FIG. 13 shows an exemplary adaptor 545 according to the invention for converting a port body 510, particularly a standard tube port body with straight threads, to a push-to-connect tube fitting assembly 508. The adaptor 545 is identical to the adapter 445, except the stepped recess retaining the lock ring 522 and the inner diameter of the support ring portion are adapted for engaging and latching to the inner end of a tube that has a locking groove 532 formed therein. Accordingly, reference may be had to the above description of the adapter shown in FIGS. 7 and 8 for the manner in which the tube is locked in the coupling plug.

FIG. 13 also shows an exemplary release device 588 that can be used to provide for release of a tube from the adaptor 545. The release device 588 includes a cylindrical sleeve 589 that is slidable along the tube and dimensioned to fit in an annular gap 590 formed between the tube and the inner diameter surface of the end wall of the coupling plug. The outer end preferably is provided with means, such as a flange 591, for facilitating pushing of the release sleeve toward the coupling plug. The inner end of the sleeve is tapered to facilitate radial expansion of the lock ring 523 when the sleeve is pushed thereagainst. The lock ring can be expanded to a diameter that frees the tube from the locking surface of the groove, after which the tube can be withdrawn from the coupling plug. Preferably, the rear wall 592 (side furthest from the leading end of the tube) of the locking groove 532 is tapered. When removal of the tube is desired, it first can be pushed inwardly from its position shown in FIG. 13, and this will cause the lock ring to ride up the tapered rear wall 592 and radially expand sufficiently to allow the tapered end of the release sleeve to move inside the lock ring when the release sleeve is pushed axially into the coupling plug.

The release device 588 and concept can be applied to any of the foregoing and other embodiments of the invention in a similar manner, as will be appreciated by those skilled in the art.

FIG. 14 Embodiment

Figure 14:
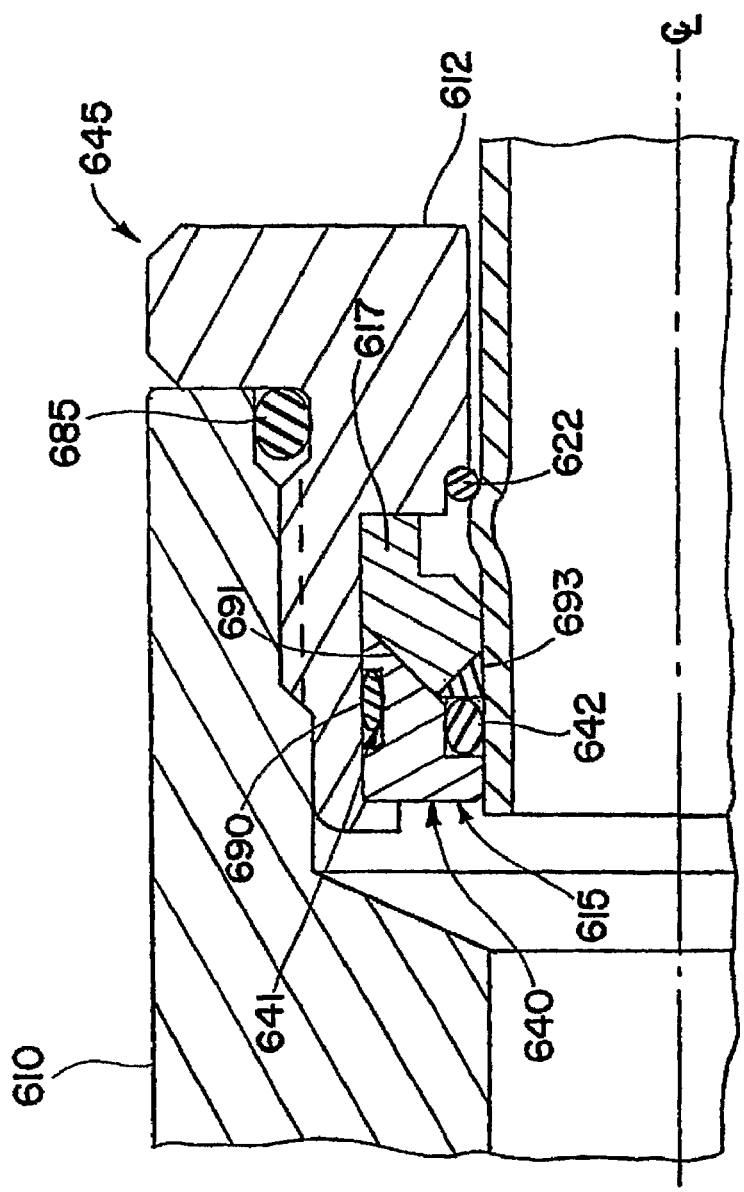
FIG. 14 is a cross-sectional view of another adaptor according to the invention, shown in combination with a standard port body and push-in tube.

In addition, adaptors for converting standard port bodies to push-to-connect tube fitting assemblies can employ separate seal and support rings within a chamber of a coupling plug similar to what is described above in relation to a coupling nut. One example of this is shown in FIG. 14 wherein a seal ring 615 includes a seal carrier 640 and an annular seal 642, and a support ring 617 formed separately of the coupling plug. The seal carrier 640 also is sealed to the interior of the coupling plug by an annular seal 690, such as an O-ring retained in an annular groove formed in the outer diameter surface of the coupling plug as shown. The rear end of the seal ring and the forward end of the support ring may be provided with matching tapers at 691 as shown such that when pressure is applied to the fitting assembly, the seal ring will be forced radially inwardly into tight gripping relationship when forced axially against the support ring by applied pressure. This will take up an clearance that might otherwise provide a gap for extrusion of the seal. The support ring may also be provided with a taper for receiving an anti-extrusion ring 693 which functions as above described.

FIG. 14 also illustrates another form or retention device that may be used to hold the interior components of the adaptor within the coupling plug, or nut as the case may be. As shown, the axially inner end of the coupling plug/nut may be swaged or otherwise bent radially inwardly to capture the axially innermost component to block its escape from the coupling nut when not assembled to a port or fitting body.

Although the tube is shown with a bulge or groove formed from or in the wall of the tube in the various exemplary embodiments described above and hereinafter claimed, the bulge can be provided by other devices, such as by a sleeve affixed to the tube.

Also, the reference herein to "tube" or "tubes" encompasses not only tubes but other tubular members such as a hose or a tubular fitting, such as a short tubular piece to which a hose, tube or the like is or can be coupled.

The characteristics of the subject of these documents revealed in the managing description, the patent claims, the summary and the design can be substantial individually and in arbitrary combinations among themselves for the implementation of the invention in their different execution forms.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An adaptor for converting to a push-to-connect tube fitting/port a standard tube fitting/port body having a threaded portion for threaded attachment of a nut/plug and a seal or sealing surface separate from the threaded portion of the standard tube fitting/port body, comprising:

a coupling nut/plug having an axially inner threaded end portion for threaded attachment to the threaded portion of the fitting/port body;

an annular tube seal contained within the coupling nut/plug for sealing to an outer diameter surface of a tube having a locking surface spaced from the end of the tube;

a radially expandable and contractible retention device retained in the coupling nut/plug, which coupling nut/plug has at an axially outer end thereof a central opening through which the tube can be inserted into the coupling nut/plug, whereby the locking surface can be engaged by the retention device to prevent axial withdrawal of the tube from the coupling nut/plug once inserted;

a support ring separate from or integral with the coupling nut/plug and axially interposed between the retention device and the tube seal; and a body sealing surface or seal separate from the annular tube seal for sealing to the seal or sealing surface of the standard tube fitting/port body; and wherein a seal carrier is arranged within the coupling nut/plug for retaining the annular tube seal, and the body sealing surface or seal include (i) a body seal retained by the seal carrier in spaced apart relationship to the annular tube seal or (ii) an axial end face seal surface on the seal carrier for sealing with an end face seal of a standard end face seal tube fitting/port body.

2. An adaptor according to claim 1, wherein the threaded end portion includes a straight thread.

3. An adaptor according to claim 1, wherein the body sealing surface or seal includes an axial end face sealing surface for sealing with an end face seal of a standard end face seal tube fitting/port body.

4. An adaptor according to claim 1, wherein the body sealing surface or seal includes a seal for sealing against a conical sealing surface of a cone style standard tube fitting/port body.

5. An adaptor according to claim 4, wherein the seal carrier includes an annular groove in which is located the seal for sealing against a conical sealing surface.

6. An adaptor according to claim 1, wherein the support ring is formed separately from the coupling nut/plug, and can be axially inserted into and removed from the coupling nut/plug.

7. An adaptor according to claim 6, wherein the retention device includes a resiliently radially expandable lock ring, and the support ring forms with a bottom wall of the coupling nut/plug a recess for accommodating the lock ring.

8. An adaptor according to claim 7, wherein the recess for accommodating the lock ring is a stepped recess, with a first step having a dimension enabling the expansion of the lock ring when the tube is inserted and a second step having a smaller radial dimension for restricting radial expansion of the lock ring beyond the locking surface of the tube.

9. An adaptor according to claim 1, in combination with the tube, and the tube is made of metal and has a bulge formed by a wall of the tube.

10. A method of converting to a push-to-connect tube fitting/port a standard tube fitting/port body having a threaded portion for threaded attachment of a nut/plug, comprising threading onto the threaded portion of the standard tube fitting/port body an adaptor as set forth in claim 1.

11. An adaptor according to claim 1, wherein the seal carrier includes an annular groove in which the annular tube seal is located.

12. An adaptor according to claim 1, wherein the annular groove in the seal carrier opens to an axial end face of the seal carrier.

13. An adaptor according to claim 1, wherein the retention device includes a resiliently radially expandable lock ring, and the coupling nut/plug includes a recess for accommodating the lock ring.

14. An adaptor according to claim 13, wherein the recess for accommodating the lock ring is a stepped recess, with a first step having a dimension enabling the expansion of the lock ring when the tube is inserted and a second step having a smaller radial dimension for restricting radial expansion of the lock ring beyond the locking surface of the tube.

15. An adaptor according to claim 1, in combination with the tube, and the locking surface is formed by a bulge formed by a wall of the tube.

16. An adaptor according to claim 1, in combination with the tube, and the locking surface is formed by a side wall of a groove in the tube.

* * * * *